United States Patent
Ernst et al.

(10) Patent No.: US 7,398,375 B2
(45) Date of Patent: Jul. 8, 2008

(54) TECHNIQUE FOR REDUCED-TAG DYNAMIC SCHEDULING AND REDUCED-TAG PREDICTION

(75) Inventors: Daniel J. Ernst, Ann Arbor, MI (US); Todd M. Austin, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 720 days.

(21) Appl. No.: 10/406,475

(22) Filed: Apr. 3, 2003

(65) Prior Publication Data
US 2003/0191925 A1    Oct. 9, 2003

Related U.S. Application Data

(60) Provisional application No. 60/370,027, filed on Apr. 4, 2002.

(51) Int. Cl.
*G06F 15/00*    (2006.01)
(52) U.S. Cl. .......................................... 712/217; 712/23
(58) Field of Classification Search ................ 712/217, 712/23
See application file for complete search history.

(56) References Cited

U.S. PATENT DOCUMENTS

| | | | |
|---|---|---|---|
| 5,404,470 A | 4/1995 | Miyake | |
| 5,473,526 A | 12/1995 | Svensson et al. | |
| 5,506,520 A | 4/1996 | Frank et al. | |
| 5,517,145 A | 5/1996 | Frank | |
| 5,526,319 A | 6/1996 | Dennard et al. | |
| 5,546,597 A * | 8/1996 | Martell et al. | 712/23 |
| 5,559,478 A | 9/1996 | Athas et al. | |
| 5,590,352 A * | 12/1996 | Zuraski, Jr. et al. | 712/23 |
| 5,604,912 A | 2/1997 | Iadonato et al. | |
| 5,634,026 A * | 5/1997 | Heaslip et al. | 712/217 |
| 5,655,096 A * | 8/1997 | Branigin | 712/200 |
| 5,838,203 A | 11/1998 | Stamoulis et al. | |
| RE37,552 E | 2/2002 | Svensson et al. | |
| 6,516,405 B1 * | 2/2003 | Yoaz et al. | 712/216 |

OTHER PUBLICATIONS

Daniele Folegnani and Antonio Gonzalez, "Energy-Effective Issue Logic", Proceedings of the 28th Annual International Symposium on Computer Architecture, Jun. 2001. p. 236.*

On Pipelining Dynamic Instruction Scheduling Logic by Jared Stark, Mary D. Brown and Yale N. Patt, Microprocessor Research Labs—Intel Corporation and Department of Electrical and Computer Engineering—The University of Texas at Austin.

(Continued)

*Primary Examiner*—Tonia L M Dollinger
(74) *Attorney, Agent, or Firm*—Rader, Fishman & Grauer, PLLC

(57) ABSTRACT

The present invention provides a dynamic scheduling scheme that uses reservation stations having at least one station that stores an at least two operand instruction. An allocator portion determines that the instruction, entering the pipeline, has one ready operand and one not-ready operand, and accordingly places it in a station having only one comparator. The one comparator then compares the not-ready operand with tags broadcasted on a result tag bus to determine when the not-ready operand becomes ready. Once ready, execution is requested to the corresponding functional unit.

9 Claims, 5 Drawing Sheets

OTHER PUBLICATIONS

Efficient Dynamic Scheduling Through Tag Elimination by Dan Ernst & Todd Austin, Advanced Computer Architecture Laboratory—University of Michigan; 29th Annual International Symposium on Computer Architecture, 2002 ISCA.

Low-Power Digital Systems Based on Adiabatic-Switching Principles by William C. Athas, Lars "J." Svensson, Member IEEE, Jeffrey G. Koller, Nestoras Tzartzanis, and Eric Ying-Chin Chou, Student Member, IEEE in the IEEE Transaction On Very Large Scale Integration (VLSI) Systems, vol. 2, No. 4, Dec. 1994.

A Resonant Clock Generator for Single-Phase Adiabatic Systems by Conrad H. Ziesler, Suhwan Kim and Marios C. Papaefthymiou. P)ublished ISLPED '01, Aug. 6-7, 2001.

Energy Recovering Static Memory by Joohee Kim, Conrad H. Ziesler & Marios C. Papaefthymiou. Published ISLPED '02, Aug. 12-14, 2002.

* cited by examiner

TECHNIQUE FOR REDUCED-TAG DYNAMIC SCHEDULING AND REDUCED-TAG PREDICTION

CROSS-REFERENCE TO RELATED APPLICATIONS

This application claims priority based on U.S. Provisional Patent Application No. 60/370,027 filed Apr. 4, 2002, the entirety of which is incorporated herein by reference.

This invention was made with government support under Grant #F002303-039305 from the National Science Foundation and Grant #98-DT-660 from MARCO. The government has certain rights in the invention.

FIELD OF THE INVENTION

The present invention generally relates to a dynamic scheduling technique, and more particularly, the present invention relates to a dynamic scheduling technique that uses tag elimination to improve the performance of dynamic scheduling.

BACKGROUND OF THE INVENTION

In an effort to secure higher levels of system performance, microprocessor designs often employ dynamic scheduling as a technique to extract information level parallelism (ILP) from serial instruction streams. Conventional dynamic scheduler designs house a window of candidate instructions from which ready instructions are sent to functional units in an out-of-order data flow fashion. The instruction window is implemented using large monolithic content addressable memories (CAMs) that track instructions and their input dependencies. While more ILP can be extracted with larger instruction windows (and accordingly larger CAM structures), such an increase in parallelism comes at the expense of slower scheduler clock speed.

In addition to performance, power dissipation has become an increasing concern in the design of high performance microprocessors. Increasing clock speeds and diminishing voltage margins have combined to produce designs that are increasingly difficult to cool. Additionally, embedded processors are more sensitive to energy usage as these designs are often powered by batteries. The present invention was developed in light of these and other obstacles.

SUMMARY OF THE INVENTION

To address these and other drawbacks, the present invention provides a dynamic scheduling scheme that uses reservation stations having at least one station that stores an at least two operand instruction. An allocator portion determines that the instruction, entering the pipeline, has one ready operand and one not-ready operand, and accordingly places it in a station having only one comparator. The one comparator then compares the not-ready operand with tags broadcasted on a result tag bus to determine when the not-ready operand becomes ready. Once ready, execution is requested to the corresponding functional unit.

In another aspect of the invention, the last received operand of the two operand instruction is predicted. The instruction is then scheduled for execution based on the prediction.

Other aspects of the invention will be apparent to those skilled in the art after reviewing the drawings and the detailed description below.

BRIEF DESCRIPTION OF THE DRAWINGS

The present invention will now be described, by way of example, with reference to the accompanying drawings, in which.

DETAILED DESCRIPTION OF THE INVENTION

It is to be understood that the present invention may be embodied in other specific forms without departing from its essential characteristics. The illustrated and described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention is based on most tag scheduler comparisons being superfluous to correct operation of the instruction scheduler. Specifically, most instructions placed into the instruction window do not require two source tag comparators due to one or more operands being ready, or because the operation doesn't require two register operands.

Figure 1:
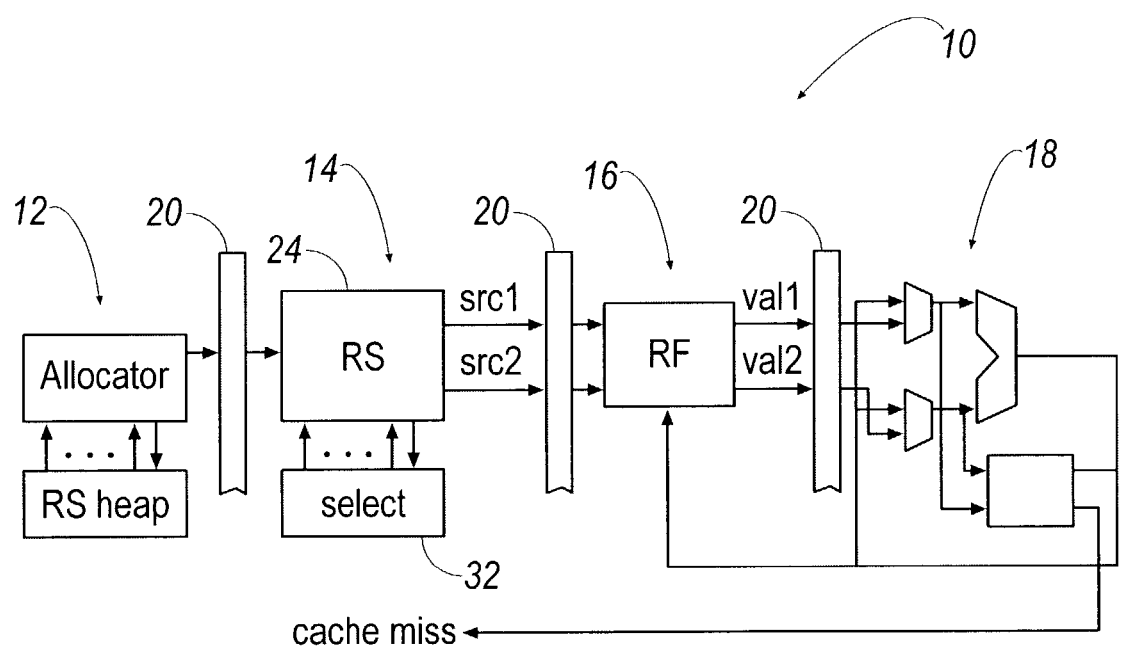
FIG. 1 is a schematic view of a dynamic scheduler pipeline according to one aspect of the present invention.

Referring now to FIG. 1, a dynamic scheduler pipeline 10 according to an aspect of the present invention is shown and described. The dynamic scheduler pipeline 10 generally includes an allocator 12, scheduler stage 14, register read stage 16 and execution stage 18. Instruction 20 is passed from stage to stage to ultimately result in its execution as described below.

The allocator 12 is responsible for reserving all resources necessary to house an instruction in the processor instruction window. These resources include reservation stations 24, reorder buffer entries, and physical registers. Scheduler stage 14 houses instructions in reservation stations 24 until they are ready to execute. Reservation stations 24 track the availability of instruction source operands. When all input operands are available, a request is made to the select logic 32 for execution (as will be described in greater detail). The select logic 32 chooses the next instructions 20 to execute from all ready instructions, based on the scheduler policy of scheduler stage 14. The selected instructions 20 receive a grant signal from the selection logic 32, at which point they are sent to later stages of the pipeline 10.

Once granted execution, source register tags of an instruction 20 are used to access the register file in the register read stage 16 of the pipeline 10. Operand values read from the register file of the register read stage 16 are forwarded to the appropriate functional unit in the execution stage 18 of the pipeline 10. If a dependent operation immediately follows an instruction, it will read a stale value from the physical register file. A bypass multiplexer is provided in the execution stage 18 to select between the incoming register operand, or a more recent value on the by-pass bus. Dependent instructions that execute in subsequent cycles must communicate via the by-pass bus. All other instructions preferably communicate by way of the physical register file.

Figure 2:
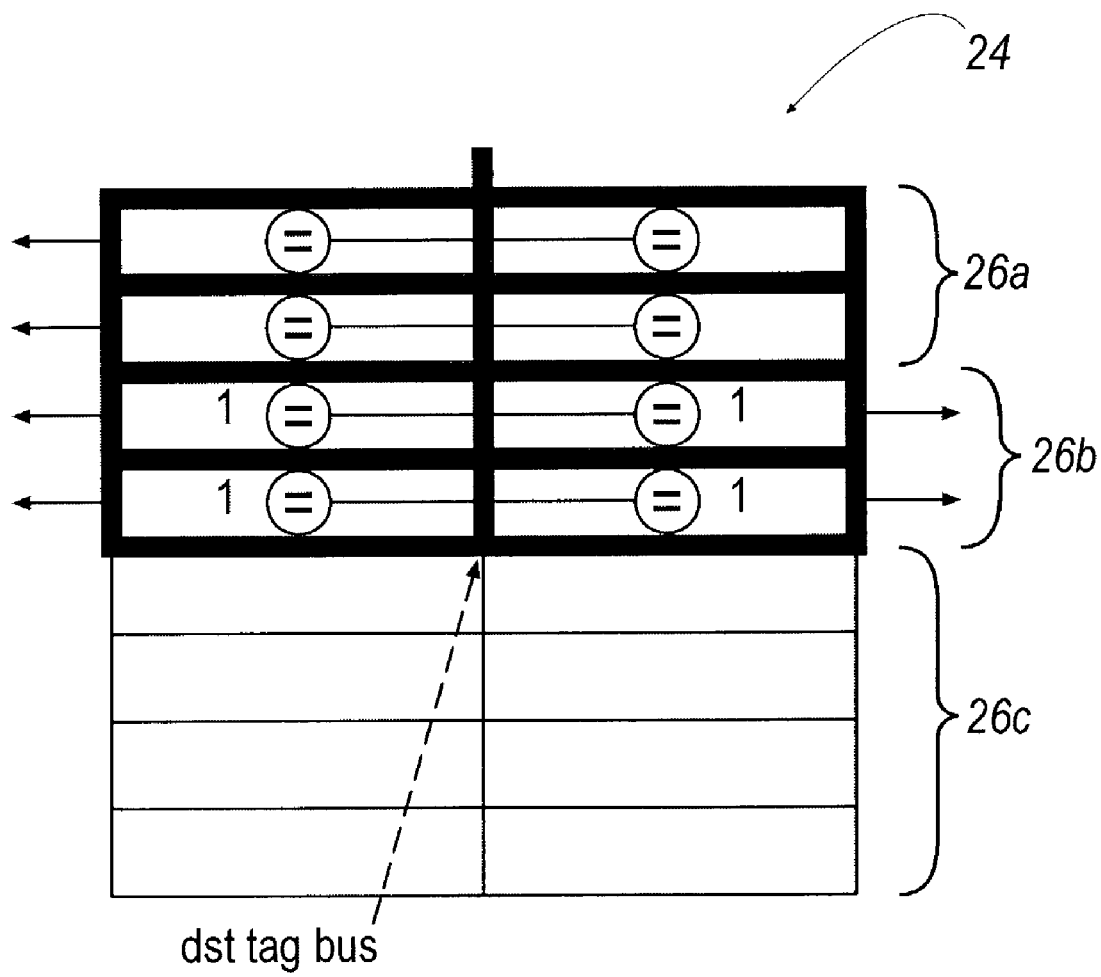
FIG. 2 is a schematic view of a reservation station according to one aspect of the present invention.
Figure 3A:
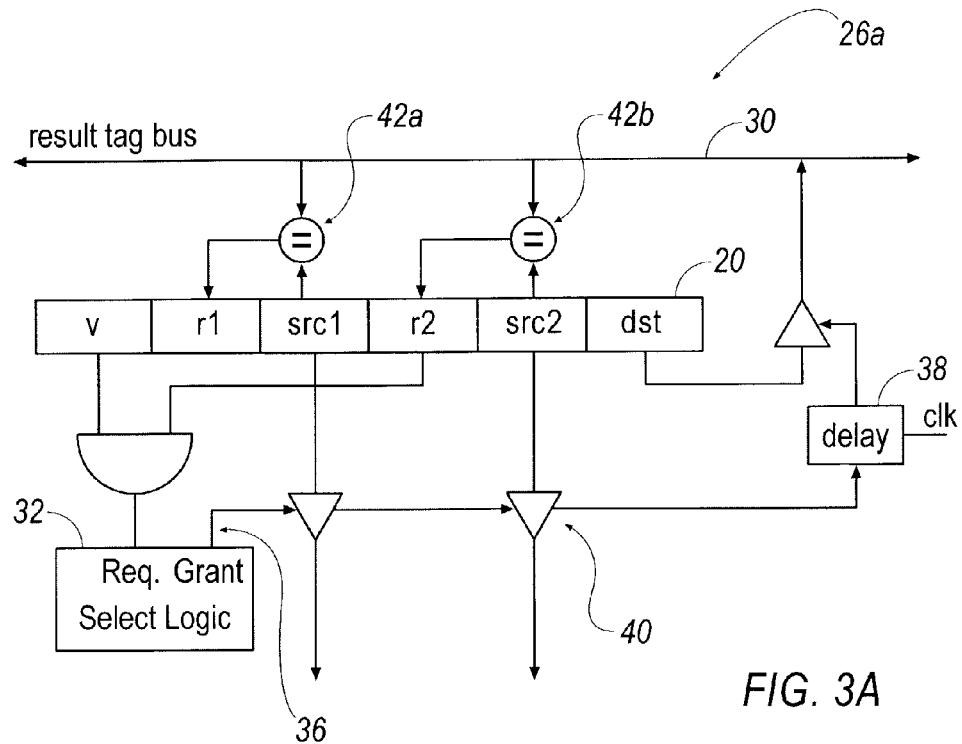
FIG. 3A is a schematic view of an instruction in a reservation station according to the present invention.
Figure 3B:
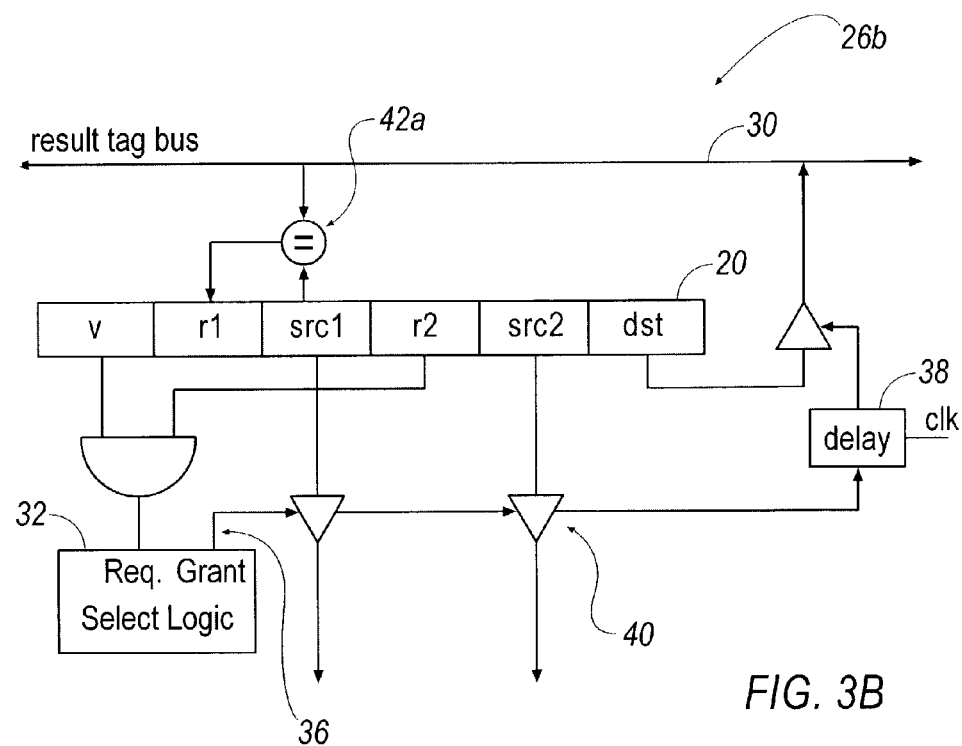
FIG. 3B is a schematic view of an instruction in a reservation station according to an aspect of the present invention.

Referring now to FIGS. 2, 3A and 3B, reservations stations 24 according to the dynamic scheduler pipeline 10 are described in greater detail. In FIG. 2, a reservation station 24 contains two tag comparator entries 26A, one tag comparator entries 26B and zero tag comparator entries 26C. By defining tag comparator entries 26B and 26C, the reservations station 24 according to the present invention eliminates the need for extra tag comparisons. Specifically, when allocator 12 encounters an instruction 20 with one or more unavailable operands, the allocator assigns the instruction 20 to a reservation station having a matching number of tag comparators. For example, if instruction 20 enters the reservation station 24 without any operands ready, then the instruction is placed into one of the reservation stations 26A. Likewise, if the instruction 20 enters the reservation station having one ready operand, then the instructions 20 is placed into one of the reservation stations 26B. If all operands are ready, then the instruction 20 is placed into one of the reservation stations 26C. If a reservation station with a sufficient number of tag comparators is not available, due to more instructions than available reservation stations, then allocator 12 stalls the front end pipeline until a reservation station is available. As a result of the scheme of FIG. 2, unnecessary tag comparisons on instructions are eliminated.

FIGS. 3A and 3B further describe the data paths and control logic for reservation stations 26A, having no operands ready, and 26B, having one operand ready. In FIG. 3A, instruction 20 is positioned in one of the available reservation stations 26A by the allocator 12. The allocator 12 determines that neither operand SRC 1 nor SRC 2 are ready, and therefore places the instruction 20 in one of these reservation stations. Here, ready bits R1 and R2 are set invalid until the operand is ready. To ascertain when either operand src1 or src2 is ready, the tag comparators 42a and 42b compare tags of the operands src1 and src2 with tags broadcasted on the result tag bus 30. Specifically, when general instructions are nearing the completion of their execution, they broadcast their result tag onto the result tag bus 30. The reservation stations 26A thus snoop the result tag bus 30, via the tag comparators 42a and 42b, waiting for a tag to appear that matches either of their source operand tags src1 or src2. If a match if found, the ready bit R1 or R2 of the matching operand tag is set. When a valid reservation station has both operand src1 and src2 marked ready via ready bit R1 and R2, a request for execution is sent to the select logic 32. The select logic 32 grants the execution request if the appropriate functional unit is available and a requesting instruction 20 has the highest priority among instructions that are ready to execute. If so, the select logic 32 sends the instruction 20 to execution by driving its grant signal. The input operand tags src1 and src2 are driven onto an output bus where they are latched for use by the register read stage 16 in the following cycle. In addition, the grant signal 36 is latched at the reservation station 26A. In the subsequent cycle, the instruction 20 drives its result tag onto the result tag bus 30. If the execution pipeline supports multicycle operations, the result tag broadcast must be delayed by a delay element 38 until the instruction result is produced.

This select logic 32 forms the control critical path in the dynamically scheduled pipeline 10. Thus, this logic forms a critical speed path in most regressive designs because it limits the rate at which instructions can begin execution. This critical path includes the result tag driver 40, the result tag bus 30 interconnect, reservation station comparators 42A and 42B, the select logic 32 and the grant signal 36 interconnect.

FIG. 3B illustrates reservations stations 26B which are dedicated for instructions 20 having one ready operand when they enter the reservation station. Therefore, they do not need to have both tag comparators to compare both tags to the result tag bus 30 as did instructions 20 in FIG. 3A. Accordingly, reservation stations 26B include only one tag comparator 42A. In this example, allocator 12 identifies that operand src2, in this particular example, is ready. Therefore, the R2 bit is set as ready when the allocator places the instruction in the scheduler stage 14 and the operand src1 is positioned to allow the tag comparator 42A to snoop the result tag bus and determine when src1 is ready. The tag comparator 42A compares only the value src1 with the tags broadcasted on the result tag bus 32 to determine when src1 is ready. Once the tag comparator 42A determines that the value src1 is ready, the ready bit R1 is set. Then, the execution is requested for the ready instruction 20. When the instruction is granted permission to execute, the source operand register tags are again driven out to the register stage of the pipeline 10. With regard to remaining reservation stations 26C, the instructions having ready values for both src1 and src2 are loaded into these reservations stations by the allocator 12, which contains no tag comparators. As such, these instructions immediately request execution upon entry into the reservation station, and await permission to execute.

Accordingly, the allocator 12 assigns instructions to a reservation station 24 having a matching number of tag comparators. If both operands src1 and src2 are ready, the instruction 20 is placed into the reservation station 26C without tag comparators and immediately request execution. If there are no available reservation stations having a matching number of tag comparators, the allocator 12 assigns the instruction through reservation stations with more tag comparators. For example, instructions 20 waiting for one operand can be assigned to reservation stations 26A or 26B with one or two tag comparators. Of course, if a reservation station with a sufficient number of tag comparators is not available, the allocator will stall the front end pipeline 10 until one becomes available. It should be noted that the scheme depicted in FIG. 2 may be altered to include more or less of any of the reservation station type 26A-26C. In a preferred embodiment of the present invention, the reservation station 24 includes two entries for two tag comparisons, four entries for one tag comparisons (each block counts as one tag comparison), and the remaining entries for ready instructions.

Figure 4:
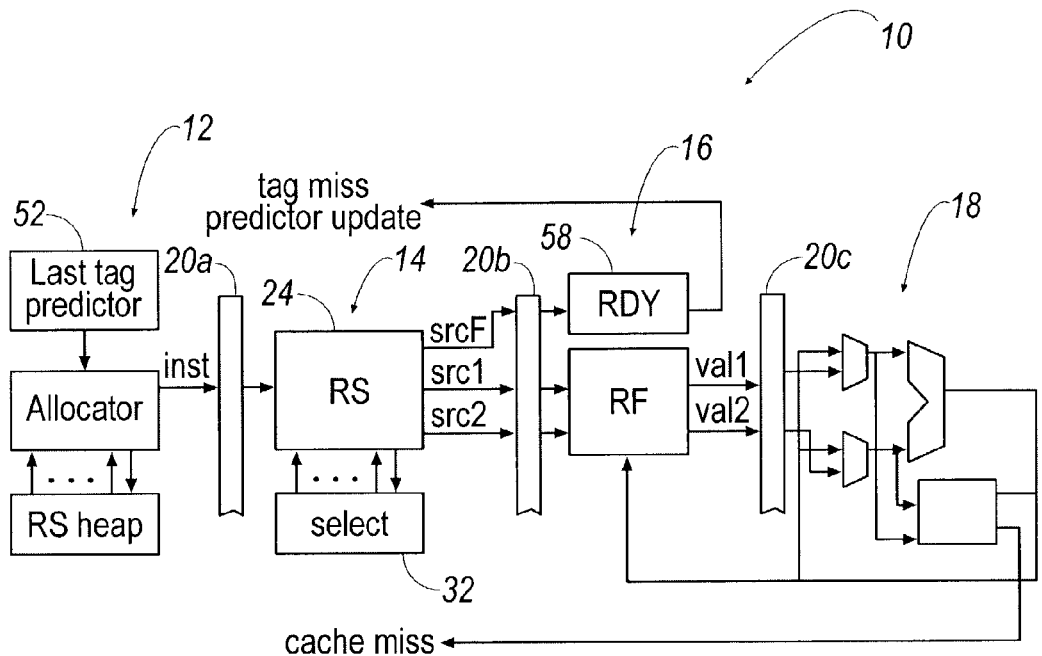
FIG. 4 is a schematic view of a dynamic scheduler pipeline according to an aspect of the present invention.
Figure 5:
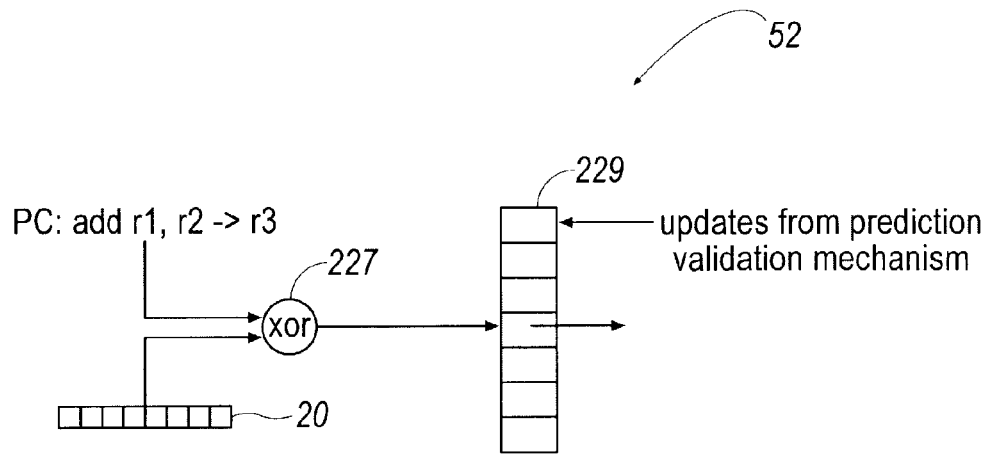
FIG. 5 is a schematic view of a last tag predictor according to an aspect of the present invention.
Figure 6:
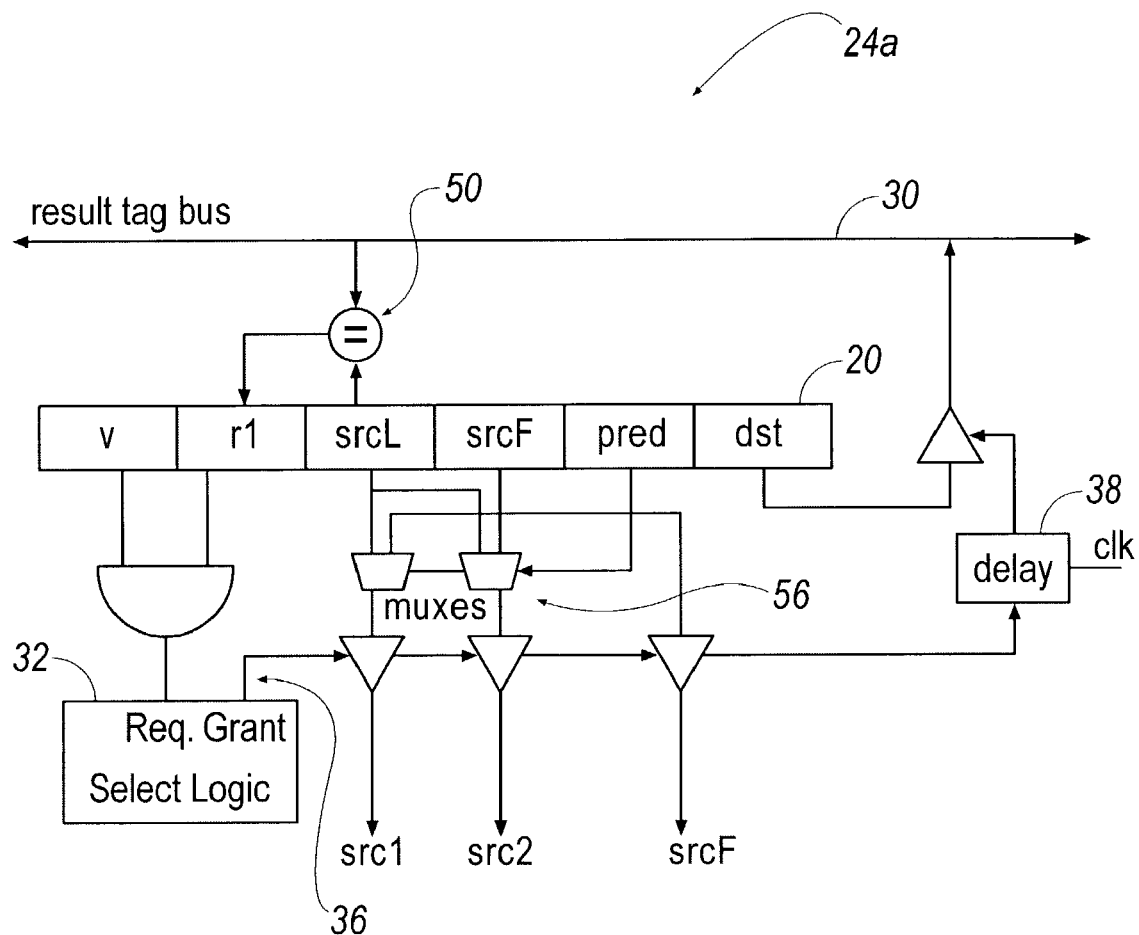
FIG. 6 is a schematic view of an instruction in a reservation station according to an aspect of the present invention.

Referring now to FIGS. 4, 5 and 6, another embodiment of the present invention is shown and described. The embodiments of FIGS. 4-6 include a process for reducing the tag reservation stations by use of a last tag predictor. In this embodiment, the reservation station is partitioned into stations having one tag comparator. Here, as shown in FIG. 4, allocator 12 accesses the last tag predictor 52 upon receiving instructions 20 with multiple unavailable operands and inserts the instruction 20 into a reservation station 24 with a single tag comparator 50 (see FIG. 6). The last tag predictor 52 predicts which operand srcL or srcF, will be available last. If the prediction is correct, the instruction wakes up at the same time it would have in a window without speculation. As shown in FIG. 5, the last tag predictor 52 is indexed with the PC of an instruction 20 (with multiple unavailable operands) hashed with global control history. The control history is XOR'ed at 227 with the least significant bits of the instruction PC and that result is used as an index into a table 229 of two-bit saturating counters. The value of the upper counter bit indicates the prediction: one indicates the left operand will arrive last, zero indicates the right operand will arrive last. The predictors are updated when last tag predictions are validated. If the prediction is incorrect, the instruction wakes up before all operands are ready, and a mis-speculation recovery sequence is initiated.

With reference to FIG. 6, the operation of the last tag predictor is described in greater detail. In FIG. 6, the input operand tags are loaded into the reservation station with the operand predicted to be available last is placed under the comparator 50. In the present example, the operand predicted to be available last is the srcL value. The other input operand tag srcF and the result tag are also loaded into the reservation station 24A. Once the instruction requests execution and execution is granted, the instruction undergoes a similar process as described previously for execution. However, in addition, the drive operation which drives the operand register tags srcL and srcF out onto the register read stage 16 of the pipeline 10 must be driven through the multiplexers 56 to sort the source operands srcL and srcF into the original instruction order, which is the format used by the register file and later functional units. In addition, the tag predicted to arrive first is forwarded to the register read stage 16, where it is used to check the correctness of the last tag prediction.

The last tag prediction is validated to ensure that the instruction does not commence execution before all of its operands srcL and srcF are available. A prediction is validated if the operand predicted to arrive first (srcF) is available when the instruction enters the register read stage 16 of the pipeline 10. In parallel with the register file access in register read stage 16, the srcF tag is used to probe a small register scoreboard or RDY 58. RDY 58 contains one bit per physical register, where bits are set if the register value is valid in the physical register file. RDY 18 is available in the allocator 12 stage of the pipeline 10 where it is used to determine if the valid bit should be set when operand tags are written into reservation stations 24. A number of ports equal to the issue with RDY 18 will suffice for validating last tag predictions. Alternatively, an additional RDY 18 can be maintained specifically for last tag prediction validation.

If the prediction is correct, the instruction 20 continues through the scheduler pipeline 10 as the scheduler has made the correct scheduling decision. If the prediction is incorrect, the scheduler pipeline is flushed and restarted, in a fashion identical to latency mispredictions. Unlike latency mispredictions, however, which are detected in memory with a three cycle penalty, last tag mispredictions can be detected before the execution stage 18, and thus only cause one cycle to bubble in the scheduler pipeline 10.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed as new and desired to be protected by Letters Patent of the United States is:

1. A reservation station comprising:
   a plurality of stations adapted to maintain an instruction having at least two source operands;
   a first subset of the plurality of stations includes two tag comparators, one for each of the at least two source operands, each of the two tag comparators is configured to snoop a result tag bus for a result tag that matches a tag for each of the respective source operands;
   a second subset of the plurality of stations includes one tag comparator assigned to one of the at least two source operands, the one tag comparator is configured to snoop the result tag bus for a result tag that matches a tag of the assigned source operand; and
   a third subset of the plurality of stations includes zero tag comparators.

2. The registration station according to claim 1, wherein:
   the first subset of stations comprises two stations;
   the second subset of stations comprises four stations; and
   the third subset of stations comprises eight stations.

3. A method for scheduling an instruction for execution, comprising:
   receiving an instruction having a first unavailable operand and a second unavailable operand;
   predicting that the second unavailable operand will become available after the first unavailable operand;
   positioning the instruction in a station having one tag comparator such that only the second unavailable operand is compared to tags broadcasted on a result tag bus by a tag comparator;
   executing the instruction when the tag comparator determines that the second unavailable operand is available.

4. The method according to claim 3, further comprising validating the prediction step after the second unavailable operand becomes available to ensure that the first unavailable operand is available.

5. A dynamic scheduler pipeline comprising:
   a reservation station having a plurality of stations for storing instructions;
   a first subset of the reservation stations, each of the first subset having two tag comparators to compare tags of respective operands in a two operand instruction in the first subset with tags broadcasted on the result tag bus;
   a second subset of the reservation stations, each of the second subset comprising one tag comparator that compares one tag of a two operand instruction in the second subset with tags broadcasted on the result tag bus;
   a third subset of the reservation stations, each of the third subset comprising no tag comparators; and
   an allocator that positions instructions into the stations based on a number of unavailable operands within the instructions;
   wherein at least one of the stations has less than two tag comparators for comparing an operand of an at least two operand instruction with tags broadcasted on a result tag bus.

6. The dynamic scheduler pipeline according to claim 5, wherein the allocator is configured to position an instruction having two unavailable operands into the first subset.

7. The dynamic scheduler pipeline according to claim 5, wherein the allocator is configured to position instructions having one unavailable operand in the second subset or first subset.

8. The dynamic scheduler pipeline according to claim 5, wherein the allocator is configured to position instructions having no unavailable operands into the third, second or first subset.

9. A method for scheduling instructions for execution, comprising:
- receiving an instruction having at least two operands, wherein at least one of the at least two operands is unavailable;
- positioning the instruction in a station of a reservation station based on a number of unavailable operands within the instruction;
- predicting which of two unavailable operands of a two operand instruction will be the last available operand and wherein the last available operand is positioned in a station having only one tag comparator;
- comparing a tag of the at least one unavailable operand with tags broadcasted on a result tag bus to determine when the unavailable operand becomes available;
- not comparing a tag of an available operand with the tags broadcasted on the result tag bus; and
- requesting permission for execution of the instruction when the at least one unavailable operand is determined to be available.

* * * * *